April 12, 1938.  H. WINOGRAD  2,113,971
ELECTRIC VALVE CONTROL SYSTEM
Filed July 19, 1935   6 Sheets-Sheet 3

Inventor
H. Winograd
by
Attorney

Patented Apr. 12, 1938

2,113,971

UNITED STATES PATENT OFFICE 2,113,971

ELECTRIC VALVE CONTROL SYSTEM

Harold Winograd, Milwaukee, Wis., assignor to Allis-Chalmers Manufacturing Company, Milwaukee, Wis., a corporation of Delaware Application July 19, 1935, Serial No. 32,210

20 Claims. (Cl. 175—363)

This invention relates in general to improvements in electric valve control systems, and more particularly to means for energizing the control electrode of an electric valve with recurring potentials having substantially vertical wave portions.

In the operation of an electric valve having a control electrode and in particular in the operation of a valve of the discontinuously controllable type, the action of the control electrode is obtained by energizing it at certain potentials with respect to a so-called critical potential, which is in a certain relation with the potential of the cathode of the valve. Such relation is however generally variable, depending on the nature of the potentials impressed on the anode of the valve and on the conditions of pressure and temperature within the valve. It is therefore advantageous to impress on the control electrode of the valve, potential impulses having substantially vertical wave portions, so as to cause the control electrode potential to pass through the critical value at predetermined instants even when such critical potential is of a somewhat indeterminate value. The vertical wave portion is the front portion of the wave when the control electrode is utilized for releasing the flow of current through the associated anode, and is the back portion of the wave when the control electrode is operable to interrupt the flow of current through the associated anode. Such method of control may then be utilized for regulating the power factor of alternating current flowing through a circuit associated with the valve, by causing dissymmetries to appear in the flux of the transformer in circuit with the valve. Both the front and the back portions of the wave may be made vertical, in particular in inverting systems in which each control electrode may remain positive for only a limited fraction of the operating cycle of the valve.

Such voltage waves having vertical portions are preferably obtained by associating with each control electrode two sources of alternating current of the same frequency but of different phases, and by rendering such sources alternately operative by means of auxiliary electric valves connected therewith. Such auxiliary valves may then be conveniently controlled by automatically regulating a unidirectional potential impressed on the control electrodes thereof.

It is, therefore, an object of the present invention to provide a static control system for an electric valve, by which the control electrode of the valve may receive potential impulses having a substantially vertical wave front portion obtained from two sources of alternating current.

Another object of the present invention is to provide a static control system for an electric valve, by which the control electrode of the valve may receive potential impulses having substantially vertical back portions.

Another object of the present invention is to provide a static control system for an electric valve, by which the control electrodes of the valve may receive potential impulses having substantially vertical front and back portions.

Another object of the present invention is to provide a static control system for an electric valve, by which the flux of a transformer connected in circuit with the valve is caused to become dissymmetrical.

Another object of the present invention is to provide a static control system for an electric valve, by which the power factor of an alternating current flowing in a circuit associated with the valve may be regulated at will.

Another object of the present invention is to provide a control system for a plurality of discontinuously controllable electric valves, by which the operation of the several valves may be controlled by means of a source of unidirectional control potential.

Objects and advantages other than those above set forth will be apparent to those skilled in the art from a consideration of the following description to be read in connection with the accompanying drawings, in which:

Fig. 1 diagrammatically illustrates one embodiment of the present invention for impressing potential impulses having vertical wave front portions on the control electrodes of a plurality of valves forming part of a rectifying system;

Fig. 2 diagrammatically illustrates another embodiment of the present invention differing from the embodiment illustrated in Fig. 1 in that the valves are utilized for inverting direct current into alternating current, and in which the control electrodes of the valves receive potential impulses having vertical front and back portions;

Fig. 3 diagrammatically illustrates a modification of the regulator employed in the embodiment illustrated in Fig. 2;

Fig. 4 diagrammatically illustrates another embodiment of the present invention differing from the embodiment illustrated in Fig. 1 in that the control electrodes of the valves receive potential impulse having vertical back portions to assist in controlling the power factor of the flow of current to be rectified by the system;

Figure 1:
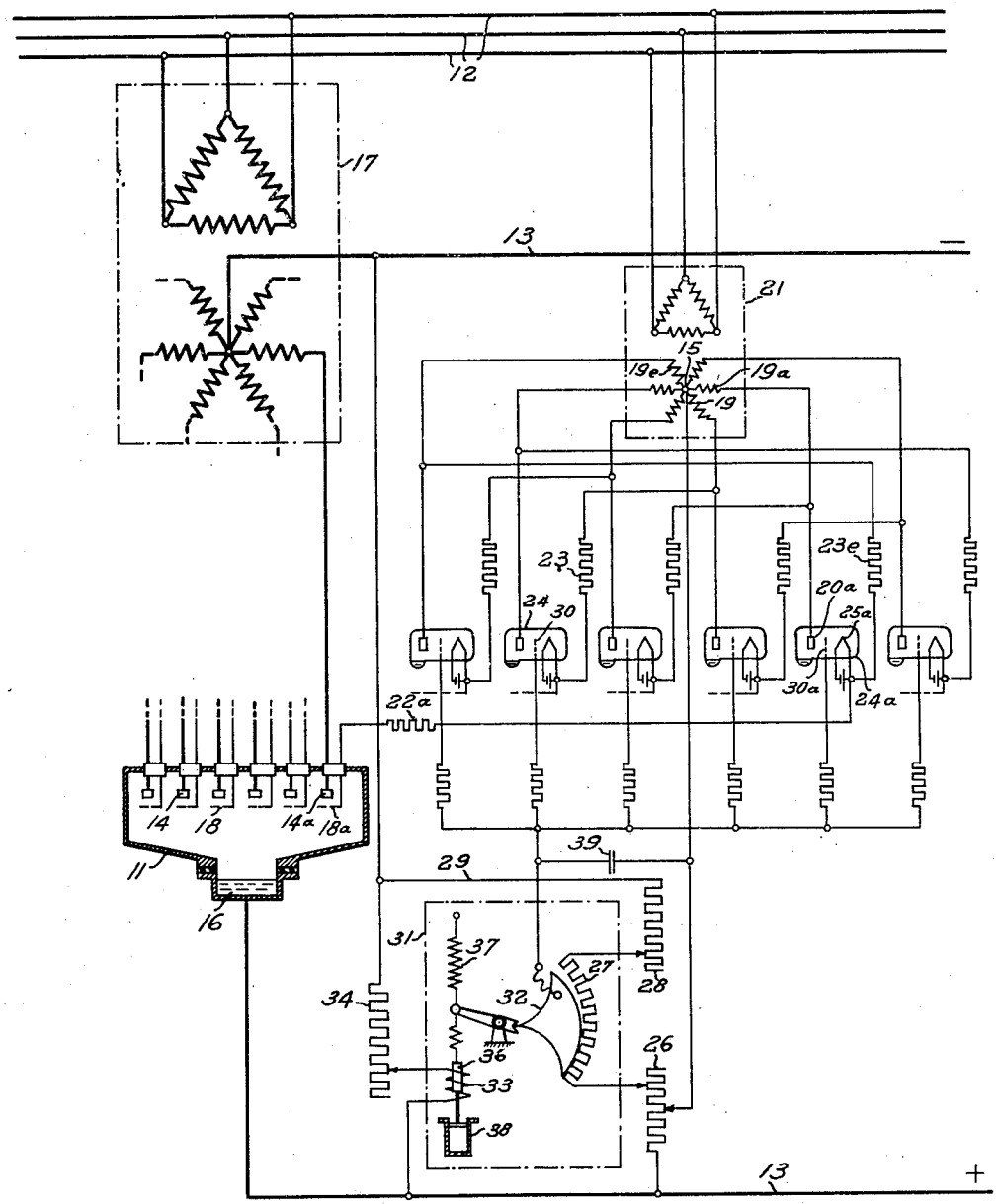

It will be understood that elements of any of the embodiments herein illustrated may be utilized in combination with elements of the other embodiments to form further embodiments of the present invention.

Referring more particularly to the drawings by characters of reference, reference numeral 11 generally designates a valve structure, constituting part of a translating system utilized for controlling the flow of energy in either direction between two electric circuits or lines 12 and 13 of different electrical characteristics. Valve structure 11 may be of any of the types known in the art, and is herein illustrated as consisting of a so-called rectifier comprising a plurality of joined valves severally provided with anodes 14, and having the cathodes thereof joined into a single cathode structure 16. It is understood, however, that each of the valves may also be provided with a separate cathode enclosed with the associated anode in a separate casing.

Lines 12 and 13 may carry current of any desired form, the translating system being arranged in a suitable manner depending upon the nature of the current to be transmitted therethrough. In the embodiments herein illustrated, line 12 is assumed to be a polyphase alternating current line and line 13 a direct current line. Line 12 is accordingly connected with anodes 14 through a transformer 17; in the embodiment illustrated in Fig. 1, cathode 16 is connected with the positive conductor of line 13 while transformer 17 is connected with the negative conductor of such line to permit transmission of energy from line 12 to line 13.

The conductivity of valves 11 is controlled by means of control electrodes 18 severally associated with anodes 14. It will be assumed that valves 11 are of the discontinuously controllable type, the control electrode of each valve being operable to prevent the flow of current therethrough when the control electrode is at a potential below the so-called critical potential, such critical potential being herein assumed to be substantially equal to the potential of cathode 16 taken as datum. Each control electrode releases the flow of current through the valve of which it is a part when such electrode is above such cathode potential, but is ineffective to continuously regulate the magnitude of such current during the flow thereof.

Each control electrode 18 is connected with cathode 16 through a circuit comprising two mutually phase displaced sources of alternating current of the same frequency, through static means operable once during each cycle of the voltage of such sources for rendering such sources operative in alternating sequence. Such sources preferably consist of inductive windings such as the star connected secondary windings 19 of a transformer 21 energized from line 12, such windings being provided with independent terminals and with a common terminal forming a neutral point 15. Although windings 19 are herein assumed to deliver voltages of sinusoidal wave shape, it will be understood that such voltages may also be given wave shapes differing from the sinusoidal, if desired, by suitably modifying the construction of transformer 21, by energizing such transformer from a source of distorted voltage, or by any other suitable method. By reason of the symmetrical arrangement of transformers 17 and 21, some or all of windings 19 may generally serve for energizing more than one of control electrodes 18 and, in the present embodiment, each winding 19 forms a part of the energizing circuit of two separate control electrodes 18.

Considering such circuits more in detail, a particular control electrode 18a associated with anode 14a is energized from a circuit including winding 19e operatively connected therewith through suitable impedance means such as resistors 22a and 23e. The action of winding 19e is to be overcome once during each cycle of the voltage of line 12 by the action of another winding 19a having the connection thereof with control electrode 18a controlled by an auxiliary valve 24a of a group of valves 24. Such valves are assumed to be of the discontinuously controllable type, in which a control electrode may release the flow of current through the valve but cannot continuously vary the magnitude of such flow of current at every instant. It will be assumed that such valves become conductive when the control electrodes thereof reach or exceed the potential of the associated cathodes. The anode 20a of valve 24a is connected with winding 19a, and the cathode 25a thereof is connected with winding 19e through resistor 23e.

As will appear hereinafter, valves 24 operate to become alternately conductive and non-conductive in response to the voltage cycle of line 12 by the mere impression of a unidirectional voltage between the control electrodes 30 thereof and neutral point 15. In the present embodiment, to obtain such voltage, neutral point 15 is connected with a tap of an adjustable resistor 26, cooperating with resistors 27 and 28 to form a voltage divider 29 connected across line 13. Resistor 27 forms part of a regulator, generally designated by 31, and which is provided with a movable tap or sector 32 connected with the control electrodes of all valves 24. Sector 32 is actuated by a solenoid 33, connected across line 13 through an adjusting rheostat 34, acting on an armature 36 against the action of a spring 37 and under the control of a dashpot 38. The regulator is thus rendered responsive to an operating condition of valve 11 to variably connect electrodes 30 with voltage divider 29. A capacitor 39 connected between sector 32 and neutral point 15, or any equivalent means, may be utilized for substantially preventing the appearance of any alternating component of the voltage of line 13 between cathodes 25 and control electrodes 30 of valves 24.

In operation, line 12 being energized, valves 11 may be rendered operative by bringing cathode 16 into electron emitting condition; such result is obtained by any of the usual means, which are well known and therefore not shown. The operation of the system will be more easily comprehended from a consideration of Fig. 5, in which curve 41 represents the voltage impressed between anode 14a and the negative conductor of line 13. Curve 42 represents the voltage of winding 19e, and, therefore, also represents the potential of the separate terminal of such winding with respect to the potential of neutral point 15 which is represented by axis 44. When valve 24a is not carrying current, curve 42 also substantially represents the potential of cathode 25a. The flow of current from winding 19e through resistors 23e and 22a, controls electrode 18a, cathode 16 and resistor 26 causes a voltage drop to appear in resistor 23e, but such voltage drop affects the potential of cathode 25a to an extent which may be disregarded in the explanation of the operation of the system. Curve 43 likewise represents the potential of the separate terminal of winding 19a and of anode 20a. The potential of cathode 16, which is positive with respect to the potential of neutral point 15, is represented by a line 46. Sector 32 and control electrodes 30 are negative with respect to the potential of point 15, and their joint potential is represented by a line 47 of ordinate depending on the position of sector 32 and on the voltage of line 13.

Valve 24a may carry current only when anode 20a is positive with respect to cathode 25a, i. e., when curve 43 is positive with respect to curve 42 and when control electrode 30a is also positive with respect to cathode 25a, i. e., when curve 42 is negative with respect to line 47. During interval AB in Fig. 5, valve 24a is inoperative, as anode 20a is negative with respect to cathode 25a. During interval BC, such valve remains inoperative because control electrode 30a is then negative with respect to cathode 25a. During the combined interval AC, control electrode 18a thus remains operatively connected with only winding 19e, and receives therefrom a potential represented by curve 42. It will be observed that such potential becomes positive with respect to the potential of cathode 16 during a portion of interval AB, without however thereby affecting the operation of anode 14a, which is then negative with respect to the potential of cathode 16. At the time represented by point c, cathode 25a becomes negative with respect to control electrode 30a, and valve 24a becomes conductive, and supplies current from winding 19a to the load circuit of the valve consisting of resistor 22a, control electrode 18a, cathode 16 and resistor 26 connected between cathode 25a and point 15. Such valve then substantially instantly closes a connection of winding 19a with the circuit of control electrode 18a, and thus operatively substitutes winding 19a for winding 19e in such circuit. Neglecting the voltage drop within valve 24a, the potential then impressed on control electrode 18a is thus substantially instantly transferred from curve 42 to curve 43; such potential substantially follows curve 43 until a moment represented by point A of the following cycle, at which moment anode 20a becomes negative with respect to cathode 25a to cause valve 24a to return to the nonconductive condition.

The circuit of control electrode 18a thus receives a voltage impulse of substantially vertical wave front once per cycle of the voltage of line 12, through repeated operation of valve 24a. The potential impressed on control electrode 18a accordingly passes rapidly through the critical potential at an accurately defined instant of the voltage cycle of line 12, regardless of the actual value of such critical potential, to thereby release the flow of current through the associated anode 14a. The course of the control electrode potential during the entire voltage cycle is represented by the heavy line in the upper portion of Fig. 5. Similar potentials are impressed on the other control electrodes 18, and the flow of current through valves 11 is caused to occur at a voltage represented by curve 48 consisting of successive portions of sine waves similar to curve 41.

If such voltage is greater than the value for which regulator 31 is adjusted, solenoid 33 moves sector 32 to render more negative the potential of control electrodes 30, represented by line 47. The result thereof is to delay the moments of the flow of current through valves 24, determined by the intersection of line 47 with the curves, such as 42, representing the potential of the cathodes of valves 24. The moments of release of the flow of current through the different valves 11 are thus delayed to a corresponding extent. As is well known, the result thereof is to reduce the output voltage of valves 11 to an extent determined by the extent of movement of sector 32. If the output voltage of valve 11 is too low, such voltage is caused to increase by a sequence of operation opposite to that above described. If regulator 31 is so arranged that the action of solenoid 33 on armature 36 is uniform at all points of the stroke thereof, the regulator will maintain the voltage of line 13 at a constant value, although such voltage may also be caused to vary in function of the flow of current through valves 11 by different arrangements of the regulator.

Figure 2:
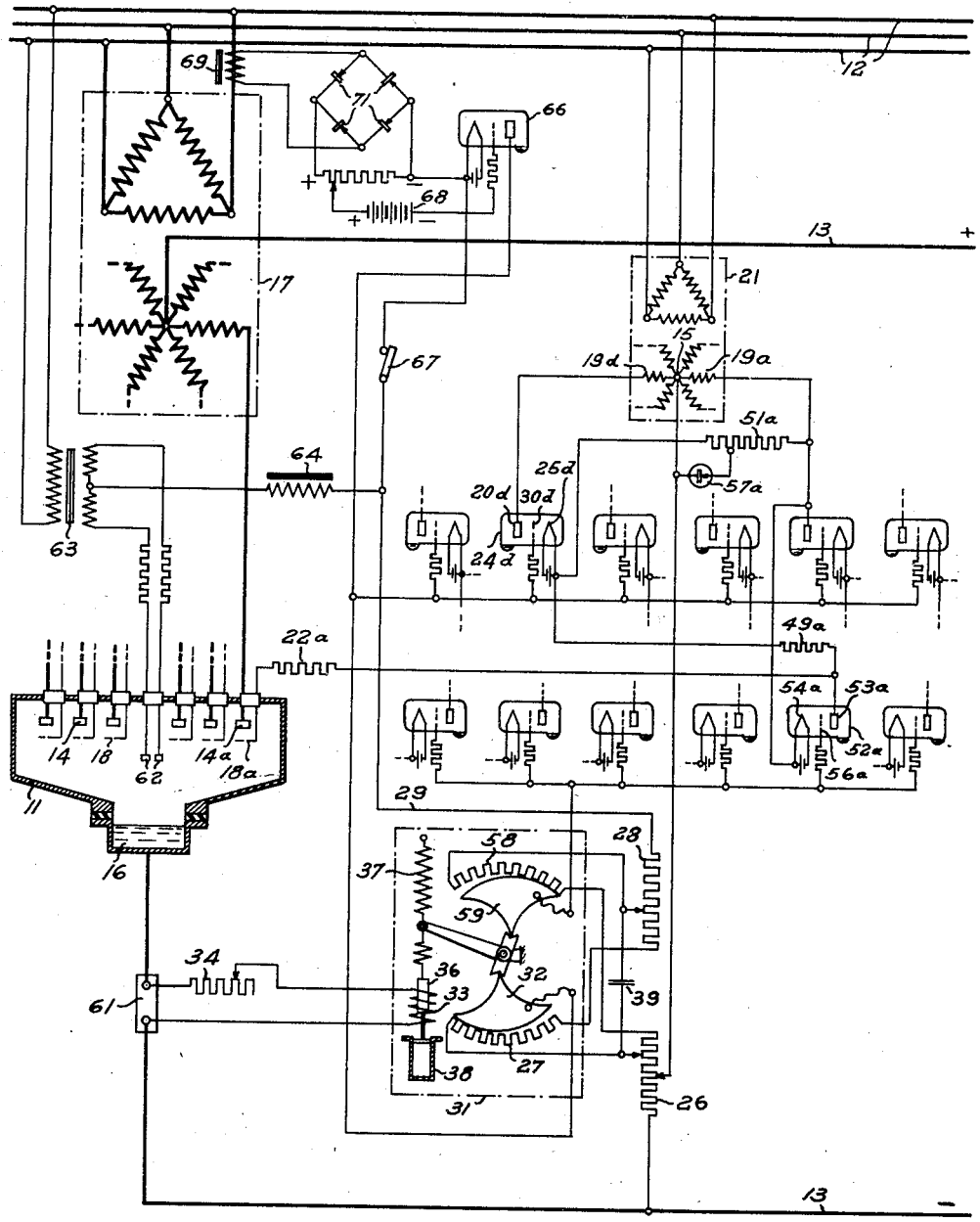

In the embodiment illustrated in Fig. 2, valves 11 are so controlled as to form with transformer 17 an inverting system transmitting energy from line 13 to line 12, the polarity of line 13 then being opposite to the polarity of such line in the embodiment illustrated in Fig. 1. As is well known, in such systems each control electrode of the valves may remain positive with respect to the potential of cathode 16 only for intervals not greater than the conductive period of the associated anode. The control electrodes 18 are therefore so connected that the circuits thereof receive positive voltage waves of adjustable duration having substantially vertical front and back portions, such result being obtained by controlling the connections of each such circuits with two of windings 19 by means including two auxiliary electric valves.

For example, control electrode 18a is arranged to be connected with the separate terminal of winding 19a through resistor 22a, and through suitable impedance means such as resistors 49a and 51a. The independent terminal of winding 19d is connected with a point intermediate resistors 49a and 51a by means of valve 24d. Another valve 52a of a group of valves 52 is connected in parallel with resistors 49a and 51a, such valve having an anode 53a connected with resistor 49a, a cathode 54a connected with winding 19a, and a control electrode 56a. Resistor 51a, or only a portion thereof, is bridged by a rectifying device 57a having the cathode thereof connected with neutral point 15. Regulator 31 is herein shown as provided with the same elements as in the embodiment illustrated in Fig. 1, and as having in addition another resistor 58 cooperating with a second sector 59 connected with the control electrodes 56 of valves 52. Resistor 58 is so connected with voltage divider 29 that the negative voltage impressed between sector 59 and neutral point 15 is somewhat greater than the voltage present between sector 32 and point 15 for all positions of regulator 31. Solenoid 33 is herein represented as being energized from a shunt 61 inserted in line 13 to render the regulator responsive to the magnitude of the flow of current through valve 11.

Voltage divider 29 is energized with rectified current from line 12 through auxiliary anodes 62 of valve 11 serving to maintain cathode 16 in conductive condition. Anodes 62 are connected with line 12 through a circuit including a transformer 63 and voltage divider 29, such circuit preferably comprising a reactor 64 to render the flow of current therethrough substantially uniform. All auxiliary valves 24 and 52 are arranged to be rendered nonconductive upon connection of sector 32 with the negative terminal of voltage divider 29 through an auxiliary valve 66. Such valve is normally maintained non-conductive by means of a battery 68 energizing the control electrode thereof, and becomes conductive when the voltage of battery 68 is overcome by the rectified voltage delivered through rectifying devices 71 by a current transformer 69 connecting transformer 17 with line 12.

Figure 5:
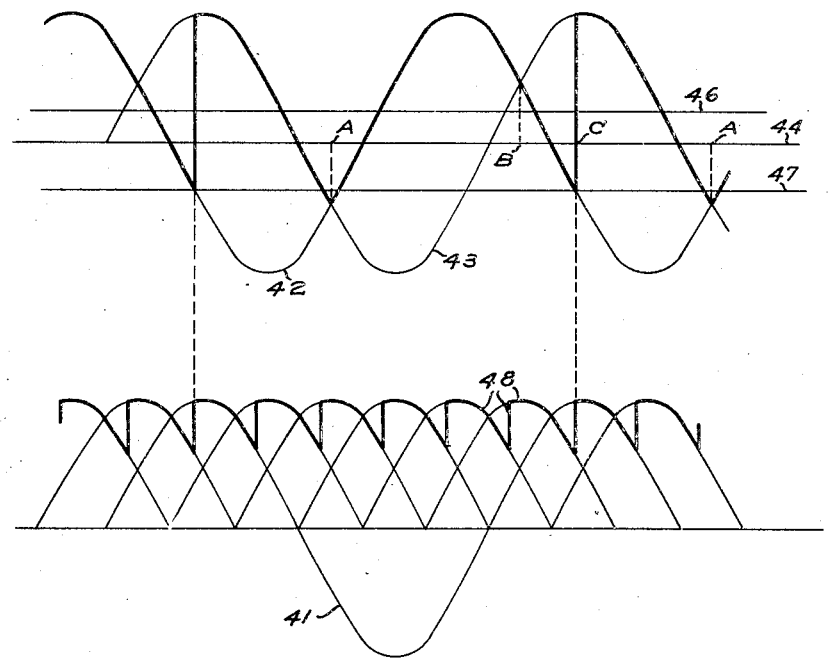
Fig. 5 is a diagram of some of the voltages appearing in the circuits of the embodiment illustrated in Fig. 1.
Figure 6:
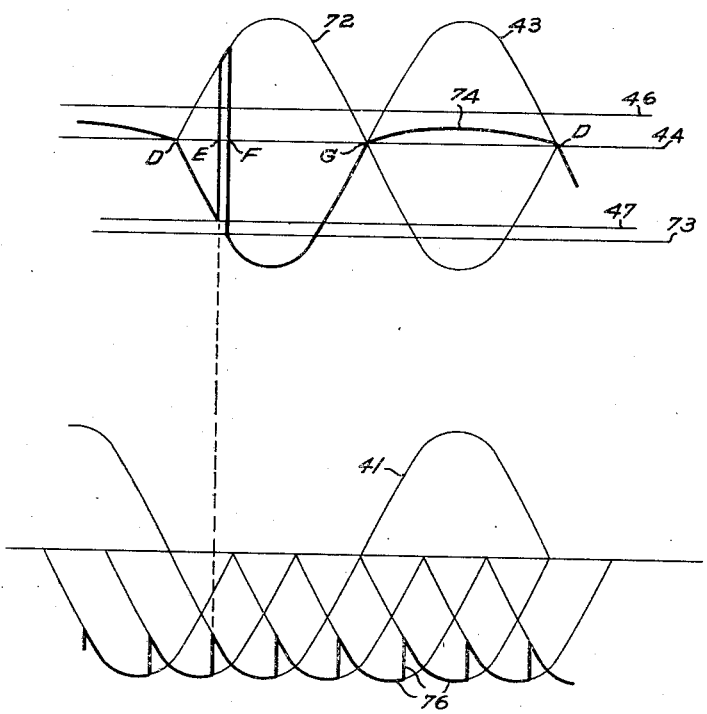
Fig. 6 is a diagram of some of the voltages appearing in the circuits of the embodiment illustrated in Fig. 2.

Fig. 6 illustrating the operation of the present embodiment reproduces curves 41, 43 and lines 46 and 47 of Fig. 5, which remain applicable to the present embodiment. The separate terminal of winding 19d follows the curve 72 displaced from curve 43 by 180 degrees. The potential of sector 59 is represented by a line 73 having a negative ordinate greater than the ordinate of line 47. Considering the operation of the system at moment D at which the voltage of winding 19a becomes negative, at first valve 24d is non-conductive as the control electrode 30d thereof is negative with respect to the potential of cathode 25d. Valve 52a is likewise non-conductive for similar reasons, and rectifying device 57a does not carry current, the voltage impressed thereon being applied in the non-conductive direction thereof. Under such conditions, control electrode 18a substantially follows curve 43 to maintain the associated anode 14a in inoperative condition.

At the moment represented by point E, control electrode 30d becomes positive with respect to cathode 25d, and valve 24d operatively connects winding 19d with control electrode 18a through resistors 49a and 22a. The voltage thus substantially instantly impressed on control electrode 18a is substantially represented by a portion of curve 72; the difference between the terminal voltages of winding 19a and 19d then appears across the terminals of resistor 51a, such differential voltage having no other effect than to cause a flow of circulating current through such resistor. At moment F, control electrode 56a becomes positive with respect to cathode 54a, and valve 52a becomes conductive. Such valve then operatively reconnects control electrode 18a with winding 19a, and the potential of such control electrode is again substantially represented by curve 43, neglecting the voltage drop in valve 52a. The circulating current between windings 19a and 19d is then increased by the flow of current through valve 24d, resistor 49a and valve 52a.

At moment G, the control electrodes of valves 52a and 24d have both become negative with respect to the associated cathodes, and the flow of current through such valves, ceases upon reversal of the voltage impressed between the anodes and the cathodes thereof. The voltage impressed on rectifying device 57a then also reverses and such device carries current, thus substantially short circuiting a portion or all of resistor 51a. The potential of control electrode 18a then differs from that of point 15 by substantially the voltage drop in device 57a and, such a device generally having a material resistance, the potential of control electrode 18a accordingly follows a curve such as 74 beginning at point G and ending at point D of the following cycle. The connection of resistor 26 with point 15 is so adjusted that control electrode 18a then remains negative with respect to cathode 16, curve 74 then remaining entirely below line 46.

The variation of the potential of control electrode 18a follows the heavy line of the upper portion of Fig. 6. The positive potential impulse impressed on the control electrode at moment E releases the flow of current through anode 14a, such flow of current occurring at a voltage represented by a portion of curve 41. The duration of the positive potential impulses of control electrode 18a, represented by distance EF, is materially shorter than the operating periods of anode 14a. Such operation is repeated successively for each anode 14 during each cycle of the voltage of line 12, the transfer of energy from line 13 to line 12 then occurring at a voltage represented by curve 76 consisting of successive portions of sine waves similar to curve 41. Regulator 31 varies the potential impressed on control electrode 30d to vary the moment E relative to the voltage cycle of line 12 as in the embodiment illustrated in Fig. 1.

The range of regulation obtainable may be adjusted by varying the connection of resistor 27 with resistor 26. The duration EF of the positive potential impulses may be varied by adjusting the connection of resistor 58 with resistor 28; such duration remaining somewhat variable depending upon the position of regulator 31 if resistors 27 and 58 are substantially uniform over the entire length thereof. The impulses may be rendered substantially uniform in duration by progressively varying the resistance per unit length of at least one of the resistors over the length thereof.

Upon the occurrence of a disturbance, such as a backfire, in one of valves 11, the flow of energy through transformer 17 reverses and a large current flows from line 12 through transformer 69, transformer 17 and between anodes 14. Such current causes rectifying devices 71 to impress on the control electrode of valve 66, a voltage overcoming the voltage of battery 68 to render valve 66 conductive. Such valve connects sector 32 with the negative terminal of voltage divider 29, thus maintaining the control electrodes of all valves 24 and 52 negative with respect to the associated cathodes. Such valves then remain non-conductive, and control electrodes 18 remain continuously negative with respect to cathode 16. For example, the voltage cycle of control electrode 18a then consists of the negative portion of curve 43 and of curve 74 in Fig. 6. The other control electrodes 18 follow similar voltage curves, and the control electrodes prevent further flow of current from line 12 to the anodes of valves 11. The direct current supplied to the valves from line 13 must however be interrupted by suitable separate means, such as by the discharge of a capacitor or by opening of a circuit breaker (not shown) as is well known.

Figure 3:
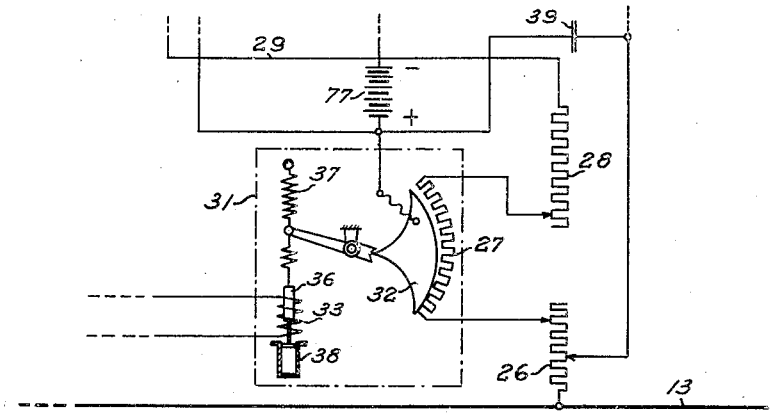

As illustrated in Fig. 3, the system of Fig. 2 may also utilize a regulator provided with only one sector as in the embodiment illustrated in Fig. 1. Sector 32 then directly controls the application of potential to the control electrodes of valves 24, and a constant voltage is maintained between such control electrodes and the control electrodes of valves 52 by means of a battery 77. As may be seen from Fig. 6, lines 47 and 73 are then at an invariable distance from each other, and the intersections of such lines with curve 43 then define variable time intervals EF for different positions of the regulator.

Figure 4:
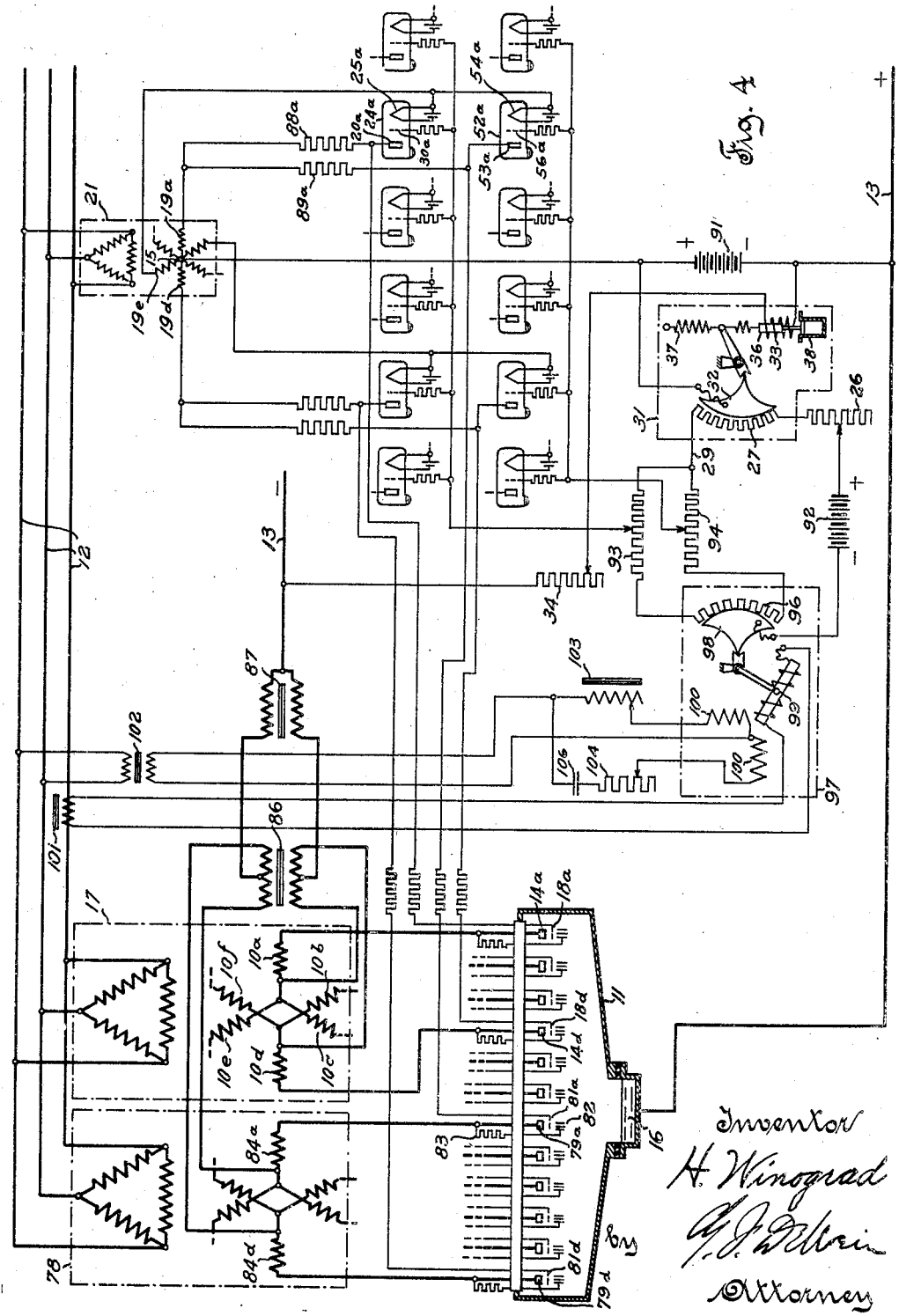

In the embodiment illustrated in Fig. 4, line 12 supplies energy to line 13 through two transmitting systems generally similar to the system illustrated in Fig. 1. Transformer 17 is accordingly connected in parallel with another transformer 78 preferably identical thereto, valves 11 then comprising the valves illustrated in Figs. 1 and 2 supplemented by an equal number of valves having anodes 79 and having control electrodes 81. In the present embodiment, control electrodes 18 and 81 are of the type operable to interrupt the flow of current through the associated anode regardless of the momentary value of the anode potential, such result being obtained upon energizing the control electrode at a suitable negative potential with respect to the potential of cathode 16. The preferred construction of such control electrode is that disclosed in U. S. Patent 1,999,764, issued April 30, 1935 to E. Kern. Each such control electrode is preferably associated with an ionization and discharge electrode 82 connected with the associated anode through a resistor 83.

The control electrodes are herein utilized for regulating the voltage of line 13 in such a manner that the transformer cores, which are made of the usual saturable magnetic material, are caused to carry a magnetic flux of dissymmetrical wave shape of magnitude extending, to a variable extent, over the curved portion of the magnetization curve. The transformers are thus caused to draw from line 12 a variable lagging magnetizing current; as will appear hereinafter, the load current flowing through transformer 17 is leading, and the magnetizing current compensates the leading component of the load current, to thereby regulate the power factor of the current supplied by line 12.

The secondary winding structures 10 and 84 of transformers 17 and 78 are each divided into pairs of phase windings such as 10a and 10d and as 84a and 84d operating at voltages in phase opposition and connected with the anodes of pairs of valves 11. The two windings of each pair are not directly interconnected but are connected with windings of other pairs to form groups of windings having neutral points. The four neutral points thus constituted are connected with the negative conductor of line 13 through the windings of two interphase transformers 86 and 87 provided for insuring the simultaneous flow of current through all groups of windings, as is well known.

In the present embodiment, each valve 24 has the anode thereof connected with one of windings 19 through a resistor 88, and has the cathode thereof directly connected with another of windings 19. Valves 52 are herein connected similarly to valves 24, and have the anodes thereof connected with windings 19 through resistors 89. Point 15 is preferably maintained positive with respect to the potential of cathode 16 by means of a battery 91. Voltage divider 29 is energized from another battery 92, and includes resistor 26, resistor 27 of regulator 31, two parallel resistors 93 and 94, and the resistor 96 of another regulator generally designated by 97. Sector 32 of regulator 31 is connected with point 15, the control electrodes 30 of valves 24 are connected with a tap of resistor 93, and the control electrodes 56 of valves 52 are connected with a tap of resistor 94. Sector 98 of regulator 97 is actuated by any suitable driving means responsive to the power factor of the joint flow of current from line 12 to transformers 17 and 78. For example, such system may include a pivotally mounted armature 99 magnetized in response to the flow of current through line 12 by means of a current transformer 101, and two fixed coils 100 energized from line 12 through a potential transformer 102 the currents of the two coils being relatively phase displaced by the action of a reactor 103 in series with one of the coils and of a resistor 104 and a capacitor 106 serially connected with the other coil.

Figure 7:
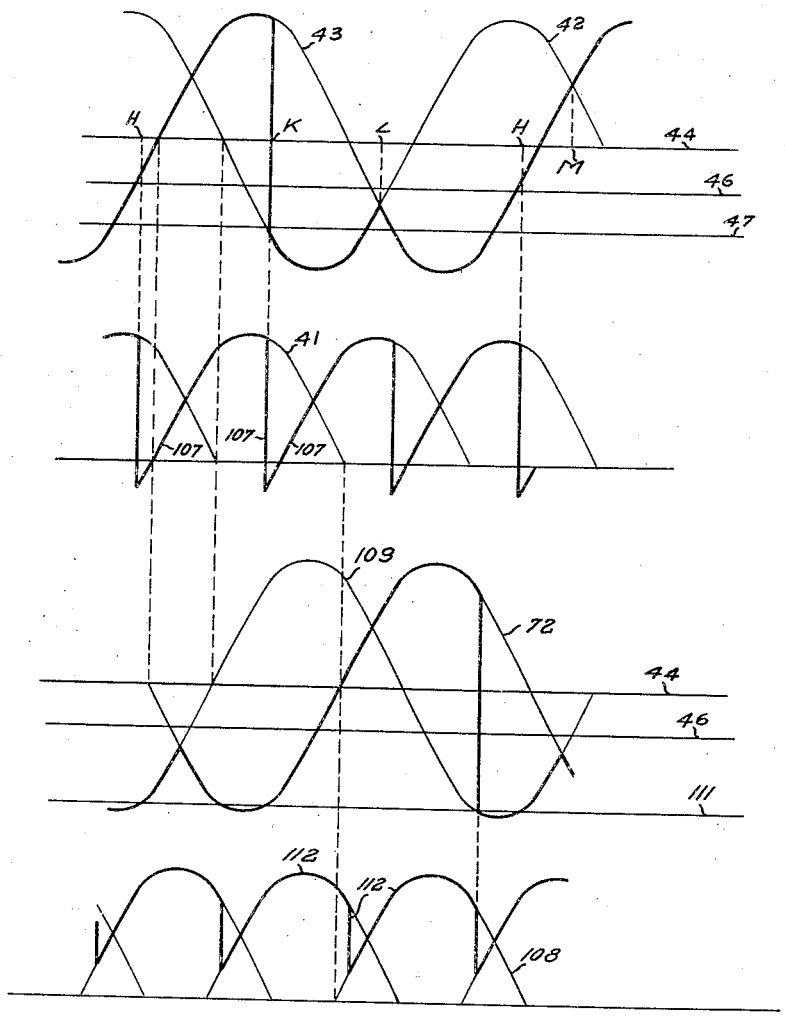
Fig. 7 is a diagram of some of the voltages appearing in the circuits of the embodiment illustrated in Fig. 4.

Fig. 7 illustrating the operation of the present embodiment reproduces curves 42 and 43 and lines 44, 46 and 47 of Fig. 5, line 46 now being however removed below axis 44 as is consistent with the polarity of battery 91. The operation of anode 14a will be considered beginning at moment H at which the flow of current through the previously operating anode is interrupted by the action of the associated control electrode. At such time, the potential of cathode 25a of valve 24a is higher than that of control electrode 30a. Valve 24a is accordingly non-conductive, and the potential impressed on control electrode 18a is that of the separate terminal of winding 19a, represented by curve 43. Such potential is positive with respect to that of cathode 16 represented by line 46, and anode 14a therefore carries current at a voltage represented by a portion of curve 41. At moment K, cathode 25a becomes negative with respect to control electrode 30a, and valve 24a becomes conductive. Control electrode 18a is then operatively connected with winding 19e, and the potential impressed thereon then substantially follows curve 42. The positive voltage wave impressed on control electrode 18a during interval HK is thereby given a substantially vertical back portion, to render control electrode 18a materially negative with respect to the critical potential.

Control electrode 18a being of the current interrupting type referred to, such energization causes the flow of current through anode 14a to be interrupted. The control electrode associated with the following anode, such as anode 14c, is then positive with respect to the potential of cathode 16, and anode 14c may then carry current although such anode is then momentarily negative with respect to anode 14a. Valve 24a continues to carry current up to moment L at which the voltage impressed between anode 20a and cathode 25a reverses. Valve 24a then ceases to carry current and fails to again carry current at moment M at which anode 24a again becomes positive with respect to cathode 30a for the reason that control electrode 30a is then negative with respect to the potential of cathode 25a.

The sequence of operation above described recurs at point H of the following cycle of line 12. Anodes 14a, 14c and 14e operate in sequence, delivering current at a voltage represented by a curve 107 consisting of portions of sine waves such as curve 41, the remaining anodes associated with winding 10 operating independently of the above anodes because of the action of interphase transformer 86. The operation of anode 14d forming a pair with anode 14a, and of anodes 14b and of 14f is entirely similar to that above described. Anode 14d operates at a voltage represented by a portion of curve 108 different from the portion of curve 41 utilized by anode 14a, control electrode 18d associated therewith operating alternately under the voltages represented substantially by curve 72 and by another curve 109 in phase opposition with respect to curve 42. The potential of control electrodes 56 is represented by a line 111 having a negative ordinate greater than the ordinate of line 47, so that the output voltage of anodes 14b, 14d and 14f is represented by a curve 112 of higher average value than curve 107.

As in the embodiment illustrated in Fig. 1, regulator 31 adjusts the potential of all control electrodes of the auxiliary valves to regulate the voltage of line 13 to a constant value less than the maximum value thereof which would be obtained if valves 11 were not provided with control electrodes. Whereas in the embodiment illustrated in Fig. 1 the effect of the regulator was to retard the flow of current through the anodes of valves 11, and thus cause transformer 17 to carry lagging current, in the present embodiment the flow of current through the anodes is advanced and the current flow through winding 10 leads the voltage thereof. For example, if the voltage of line 13 is too high, regulator 31 moves sector 32 to decrease the voltage between point 15 and control electrodes 30 and 56. Valves 24 and 52 accordingly become conductive at earlier moments of the voltage cycle of line 12, and cause the flow of current through anodes 14 to be advanced, thereby tending to advance the phase of the current through the primary winding of transformer 17.

Such action however causes regulator 97, which is responsive to the phase angle of such current, to move sector 98 to thereby inversely vary the potentials of control electrodes 30 and 56, of which only the average value is determined by regulator 31. As observed above, winding 10a then delivers current under an average voltage lower than the average output voltage of winding 10d, and winding 10d accordingly carries a pulsating current of greater magnitude than winding 10a. The alternating flux present in the core associated with windings 10a and 10d is therefore caused to present a unidirectional component, thereby causing the flow of alternating current in the associated primary phase winding to become dissymmetrical. The magnitude of such flux in one of the directions of flow thereof may then reach values corresponding to the curved portion of the magnetization curve of the core material, and the transformer accordingly draws from line 12, a magnetizing current greater than the magnetizing current normally present when the flux within the transformer coil is symmetrical. A similar action takes place in all phases of transformer 17 as a result of the unbalance of the currents of the other pairs of anodes associated therewith. The magnetizing current compensates the leading component of the load current in the primary winding of transformer 17 to an extent depending upon the extent of the dissymmetry of the current in windings 10 resulting from the action of regulator 97. Regulator 97 causes such magnetizing current to increase to the point of maintaining the power factor of the flow of current through line 12 at the value for which the regulator is adjusted, which is usually unity.

If a translating system utilizing a single transformer 17 is used alone, the flow of current through line 12 is dissymmetrical and the advantages of a higher power factor are not fully available. It is therefore preferred to associate with the system a second duplicate translating system utilizing transformer 78 and anodes 79. The two systems are jointly regulated by regulator 97 so as to restore the symmetry of the current in line 12. Considering for example control electrodes 18a, 18d, 81a, and 81d controlling the flow of current through one phase of line 12 by way of windings 10a, 10d, 84a, and 84d; regulator 97 simultaneously advances the application of control potentials, through the proper valves 24, on control electrodes 18a and 81d to a certain extent, and advances the application of control potentials through the proper valves 52, on control electrodes 18d and 81a to a lesser extent, the control electrodes associated with the other phases of transformers 17 and 78 being similarly controlled. In this manner the dissymmetries in the currents of transformers 17 and 78 are equal and of opposite signs, so that they cancel in the total current supplied to the transformers by line 12.

Although but a few embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. In an electric translating system, an electric valve of controllable conductivity, means for controlling the conductivity of said valve comprising an element of said valve having connections with a first source of alternating current and a second source of alternating current, the voltages of said sources being of the same frequency and being mutually phase displaced, and static means operable once during each cycle of the voltages of said sources for rendering said sources operative in alternate sequence to impress a potential on said element.

2. In an electric translating system, an electric valve having an anode with an associated control electrode and a cathode, a circuit connecting said control electrode with said cathode and including a first source of alternating current and a second source of alternating current, the voltages of said sources being of the same frequency and being mutually phase displaced, and static means operable once during each cycle of the voltages of said sources for rendering said sources alternately operative to impress a potential on said control electrode.

3. In an electric translating system, an electric valve having an anode with an associated control electrode and a cathode, a circuit connecting said control electrode with said cathode and including a first source of alternating current operatively connected therewith and a second source of alternating current, said sources delivering mutually phase displaced voltages of a common frequency, and static means responsive to the voltage cycle of said sources for operatively substituting the second said source for the first said source once during each cycle of the voltages thereof and including means for substantially instantly closing a connection of the second said source with said circuit.

4. In an electric translating system, an electric valve having an anode with an associated control electrode and a cathode, a circuit connecting said control electrode with said cathode, means for impressing voltage impulses of substantially vertical wave front on said circuit and including two mutually phase displaced alternating current sources of common frequency, and static means reiteratively controlling a connection of one of said sources with said circuit.

5. In an electric translating system, an electric valve having an anode with an associated control electrode and a cathode, a circuit connecting said control electrode with said cathode, means for impressing voltage impulses of substantially vertical wave back on said circuit and including two mutually phase displaced alternating current sources of common frequency, and static means reiteratively controlling a connection of one of said sources with said circuit.

6. In an electric translating system, an electric valve having an anode with an associated control electrode and a cathode, a circuit connecting said control electrode with said cathode, means for impressing voltage waves having substantially vertical front and back portions on said circuit and including two mutually phase displaced alternating current sources of same frequency, and static means controlling a connection of each of said sources with said circuit.

7. In an electric translating system, an electric valve having an anode with an associated control electrode and a cathode, a circuit connecting said control electrode with said cathode and including a first source of alternating current operatively connected therewith and a second source of alternating current, said sources delivering mutually phase displaced voltages of a common frequency, an auxiliary electric valve for operatively connecting the second said source with said control electrode, and means for controlling the conductivity of said auxiliary valve to alternately render said auxiliary valve conductive and non-conductive during each cycle of the voltage of said sources.

8. In a control system, a plurality of mutually phase displaced sources of alternating current of one frequency connected to form a neutral point, a plurality of electric valves having anodes with associated control electrodes and cathodes, means for severally connecting said anodes with said sources, a plurality of independent load circuits severally connecting said cathodes with said neutral point, a source of variable unidirectional voltage, and means for impressing said unidirectional voltage between said control electrodes and said neutral point whereby the conductivity of said valves is controlled solely in dependence upon said unidirectional voltage.

9. In a control system, a plurality of mutually phase displaced sources of alternating current of one frequency connected to form a neutral point, a plurality of electric valves having anodes with associated control electrodes and cathodes, means for connecting the anode of each said valves with one of said sources and the associated cathode with another one of said sources, means for connecting said anodes and said cathodes with the said neutral point, and means for controlling the conductivity of said valves.

10. In an electric translating system, a polyphase system of alternating current neutral point connected windings and each having separate terminals, a direct current circuit, a plurality of electric valves each having an anode with an associated control electrode and a cathode, connections between said windings and said circuit by way of said valves and including means for severally connecting each of said terminals with at least one of said cathodes, means connected with said direct current circuit for producing a variable unidirectional voltage, and means for impressing said unidirectional voltage between said control electrodes and said neutral point whereby the conductivity of said valves is controlled solely in dependence upon said unidirectional voltage.

11. In an electric translating system, an alternating current line, a direct current line, an electric valve connecting said lines to control the flow of current therebetween and having an anode with a control electrode and a cathode, a plurality of inductive windings energized at mutually phase displaced alternating voltages from said alternating current line, a circuit connecting said control electrode with said cathode and including one of said windings, an auxiliary electric valve connecting another of said windings with said circuit, and means for rendering said auxiliary valve alternately conductive and non-conductive during each cycle of the voltage of said alternating current line.

12. In an electric translating system, an alternating current line, a direct current line, an electric valve connecting said lines to control the flow of current therebetween and having an anode with a control electrode and a cathode, a plurality of inductive windings energized at mutually phase displaced alternating voltages from said alternating current lines and having a common terminal and separate terminals, means for connecting said common terminal with said cathode, impedance means connecting one of said separate terminals with said control electrode, an auxiliary valve for connecting another of said separate terminals with said control electrode and having a control electrode, and means for impressing a variable unidirectional voltage between the second said control electrode and the said terminal.

13. In an electric translating system, an alternating current line, a direct current line, an electric valve connecting said lines to control the flow of current therebetween and having an anode with a control electrode and a cathode, a plurality of inductive windings energized at mutually phase displaced alternating voltages from said alternating current line and having a common terminal and separate terminals, means for connecting said common terminal with said cathode, impedance means connecting one of said separate terminals with said control electrode, an auxiliary valve for connecting another of said separate terminals with said control electrode and having a control electrode, a voltage divider connected across said direct current line, and a regulator responsive to an operating condition of the first said valve for variably connecting the second said control electrode with said voltage divider.

14. In an electric translating system, an alternating current line, a direct current line, an electric valve connecting said lines to control the flow of current therebetween and having an anode with a control electrode and a cathode, a plurality of inductive windings energized at mutually phase displaced alternating voltages from said alternating current lines and having a common terminal and separate terminals, means for connecting said common terminal with said cathode, impedance means connecting one of said separate terminals with said control electrode, an auxiliary valve for connecting another of said separate terminals with said control electrode and having a control electrode, an auxiliary anode in the first said valve, a circuit connecting said auxiliary anode with said lines and including a transformer energized from said alternating current line and a resistor connected with the first said cathode, and a regulator responsive to an operating condition of the first said valve for variably connecting the second said control electrode with said resistor.

15. In an electric translating system, an alternating current line, a direct current line, an electric valve connecting said lines to control the flow of current therebetween and having an anode with a control electrode and a cathode, a plurality of inductive windings energized at mutually phase displaced alternating voltages from said alternating current lines and having a common terminal and separate terminals, means for connecting said common terminal with said cathode, impedance means connecting one of said separate terminals with said control electrode, an auxiliary valve for connecting another of said separate terminals with an intermediate point of said impedance means, another auxiliary valve connected in parallel with said impedance means, said auxiliary valves having control electrodes, means for impressing unidirectional voltages of different magnitudes between the control electrodes of the first and second said auxiliary valves and said common terminal, and a rectifying device connected between a point of said impedance means and said common terminal.

16. In an electric translating system, an alternating current line, a transformer connected with said line and having a pair of windings operating at voltages in phase opposition, a direct current line, a pair of electric valves severally connecting said lines by way of said transformer windings and each provided with electrodes including a control electrode operable to release and to interrupt the flow of current therethrough, means connected with one of said electrodes other than said control electrode of each said valve for producing control voltages, means for continually impressing potentials from the first said means on said control electrodes, and means controlling the second said means to simultaneously advance the application of said control potentials on each of said control electrodes by amounts differing from each other during the voltage cycle of said alternating current line.

17. In an electric translating system, an altersecond translating system connected in parallel with the first said translating system and identical thereto, and means for simultaneously advancing the application of the control potentials on one control electrode of one translating system and on the control electrode of the other translating system operating in phase opposition thereto to a predetermined extent and advancing the application of the control potentials on the other said control electrode of each translating system to a different extent, and an inductive winding connecting said systems with said direct current line to cause simultaneous flow of current through both systems at every instant.

19. In an electric translating system, the combination with an alternating current line, a transformer connected with said line and comprising a pair of windings arranged in phase opposition, a direct current line, and a pair of electric valves comprising anodes severally interconnecting said lines by way of said windings and constituting spaced electrodes for the flow of current between said lines, of means for controlling said flow of current and for controlling the power factor thereof comprising control electrodes severally associated with said anodes, means for continually impressing potentials on said control electrodes of such sign, magnitude and during such moments relative to the voltage cycle of said alternating current line as to control the recurring moments of initiation and duration of said flow of current, and means operable responsive to changes in the power factor value of said current for varying the moments of application of said potentials to said control electrodes in such sense and extents, relative to the voltage cycle of said alternating current line, as to cause the power factor of said current to be maintained at a predetermined value.

20. In combination with an alternating current line, and a pair of